H. H. WILLIAMS.
RECORDING DEVICE.
APPLICATION FILED MAR. 1, 1917.
1,284,521.
Patented Nov. 12, 1918.
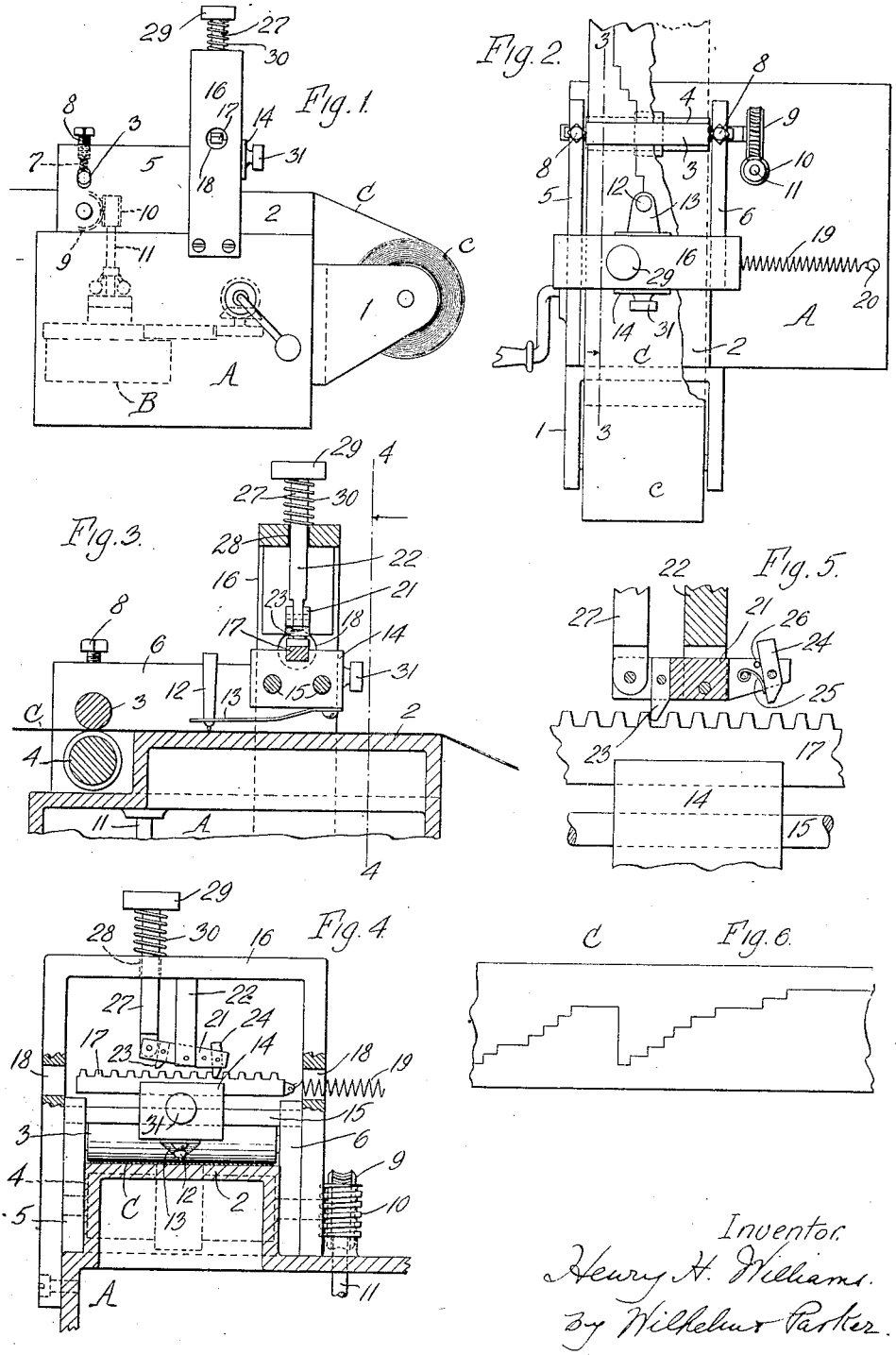

UNITED STATES PATENT OFFICE.

HENRY H. WILLIAMS, OF BUFFALO, NEW YORK.

RECORDING DEVICE.

1,284,521.  Specification of Letters Patent.  Patented Nov. 12, 1918.

Application filed March 1, 1917. Serial No. 151,684.

*To all whom it may concern:*

Be it known that I, HENRY H. WILLIAMS, a citizen of the United States, residing at Buffalo, in the county of Erie and State of New York, have invented a new and useful Improvement in Recording Devices, of which the following is a specification.

This invention relates to a device for use in determining and recording various periods of time consumed in performing motions or acts, particularly where the periods of time to be recorded are of short duration. The device is desiable, for instance, for determining and recording the various periods of time consumed by a workman in making the various motions or performing the several operations necessary in the completion of a particular job or piece of work so as to enable the time consumed on the job to be accurately determined and apportioned among the several component motions or operations of the work. Various devices have been heretofore suggested for a similar purpose but these devices are so slow in operation or necessitate such manipulation and attention by the persons using the same and observing the workmen that they are not practical for recording the extremely short periods of time occupied in the performance of many of the motions or component operations concerning which it is desired to secure data.

The object of this invention is to provide a practical and desirable device for the purpose stated, which can be operated very rapidly and without special attention on the part of the user, so that he can observe and accurately record the periods of time consumed in the various motions or operations performed by a workman, even when these periods of time are small fractions of a second. Another object of the invention is to improve devices of this nature in the particulars hereinafter described and set forth in the claims.

To this end the device comprises a record strip or member which is caused to travel at a definite or predetermined rate of speed by suitable driving mechanism, a stylus or device adapted to trace a line on the record strip or member, and actuating means by which the stylus or marking device can be rapidly shifted relatively to the recording member so as to indicate the successive periods of time which it is desired to record.

In the accompanying drawings:

Figure 1 is a side elevation, on a reduced scale, of a recording device embodying the invention.

Fig. 2 is a plan view thereof showing the record strip partially broken away to disclose the underlying parts.

Fig. 3 is a fragmentary longitudinal sectional elevation thereof on an enlarged scale on line 3—3, Fig. 2.

Fig. 4 is a transverse sectional elevation thereof on line 4—4, Fig. 3, parts of the yoke being shown in section.

Fig. 5 is a sectional elevation of the escapement mechanism for the carriage for the stylus or marking device.

Fig. 6 is a short length of the record strip showing a record traced thereon.

A represents a box or casing in which is housed a motor B adapted to propel a record strip or member C of any suitable kind at a definite or predetermined rate of speed. Any suitable sort may be employed. The record strip or member shown consists of a narrow strip of paper or other suitable material which is wound in a roll $c$ journaled in a bracket 1 at one end of the casing A, and is unwound from the roll and advanced by suitable feed mechanism driven by the motor B. Preferably the record strip passes over a flat table or platen 2 at the top of the casing A and between a pair of feed rolls 3 and 4. The lower feed roll shown has a surface band of rubber or other material adapted to afford the requisite friction on the record strip, and the roll 3 is journaled in vertically elongated slots in upright bearing plates 5 and 6 at its opposite ends, and is pressed toward the lower roll by springs 7 which engage the journals of the upper roll. The pressure of these springs is regulated by adjustable screws 8. One of the journals of the lower roll extends beyond the bearing plate 6 and is provided with a worm wheel 9 which meshes with a worm 10 on an upright shaft 11 which is driven by the motor and extends out through the top of the casing A. Any other arrangement of the record strip or member and any other suitable drive mechanism for causing the record strip to travel at a proper rate of speed could be employed.

12 represents a stylus, which may be a pencil or other device adapted to trace a line on the record strip. The stylus shown is carried by a spring 13 which is secured to a supporting carriage 14 and presses the marking point of the stylus against the upper surface of the record strip over the table or plate 2. The stylus carriage 14 is mounted in any suitable manner so that it can be moved at will to shift the stylus across the record strip transversely to the direction of travel thereof for marking in different paths on the record strip. Preferably a spring is employed which tends to move the carriage in one direction across the record strip, and the movement of the carriage by the spring is controlled by a key-actuated escapement mechanism by which the operator can, by operating the key, cause the carriage and stylus to move intermittently a step at a time across the record strip. In the construction shown the carriage 14 is arranged to slide on two horizontal guide rods 15 secured in the plates 5 and 6 and confined by a supporting frame or yoke 16 rising from the casing A, and is provided at its top with a toothed bar or rack 17 adapted to move through holes 18 in the opposite legs of the yoke 16, and a spring 19 attached at its opposite ends to the rack bar and to a post or part 20 on the casing tends to move the carriage to the right as shown in Figs. 2 and 4 of the drawings. 21 is an escapement lever which is pivoted between its ends on a support 22 depending from the cross bar of the yoke 16. This escapement lever is provided at opposite sides of its fulcrum with pawls or dogs 23 and 24, the former of which is stationarily secured to the lever, while the latter is pivoted on the lever and is normally held by a spring 25 in the position shown in Fig. 5 against a stop pin 26 on the escapement lever. One end of the escapement lever is pivotally connected to the lower end of a rod or stem 27 which is adapted to slide vertically in a guide hole 28 in the cross bar of the supporting yoke 16, and is provided at its upper end with a finger key 29 by which the rod may be depressed to oscillate the escapement lever. A spring 30 surrounding the key stem between the finger key and the yoke 16 acts to raise the key and the adjacent end of the escapement lever and hold the pivoted pawl 24 at the opposite end of the lever in contact with one of the teeth of the rack bar as shown in Fig. 4. The carriage and stylus are thus held from movement by the spring 19. If the finger key is depressed the pawl 24 will be disengaged from one tooth of the rack bar and the other pawl 23 lowered to position to intercept another tooth, and the rack bar will thus be permitted to move to the right under the pull of the spring until arrested by the engagement of the last mentioned tooth with the pawl 23. When the finger key is released the spring 30 will raise it and the pawl 23 and lower the other pawl 24 into position to intercept one of the teeth of the rack bar. Thus the carriage and the stylus are adapted to be moved intermittently one step at a time across the record strip by depressing and releasing the finger key, and as the carriage moves one step each time the finger key is either depressed or raised, the stylus can be moved from one position to the next, across the record strip, very quickly and with the minimum attention on the part of the operator. When the carriage reaches the limit of its movement to the right by the spring, it can be set back to the left, the spring pawl 24 which is normally in engagement with the rack, yielding to permit such movement, and the step by step movement of the carriage to the right can then be repeated by the described actuation of the finger key. A knob 31 on the carriage provides a convenient handle by means of which to thus set back the carriage.

In the use of the device, assuming that the motor has been wound, that the record strip is being propelled forwardly by the motor-driven feed rolls and that the carriage has been set back with the stylus near the left-hand margin of the record sheet, the operator observes the workman, moving the stylus one step when the workman commences a movement or operation and another step when this movement or operation is completed or the next one started, the stylus being thus moved successive steps coincidently with the commencement of the successive movements or operations performed by the workman. The stylus will thus trace a stepped line on the record strip, the successive longitudinal portions of which line will represent the successive movements or operations performed by the workman. Inasmuch as the record strip travels at a uniform known rate of speed, the length of each longitudinal portion of the record line wil indicate the length of time consumed in the corresponding movement or operation of the workman. The record strip can be suitably ruled or calibrated to represent suitable fractions of a minute or other unit of time, in which case the lengths of the longitudinal portions of the record line and the lengths of the periods of time represented thereby will be directly indicated by the time graduations of the record strip, or, if desired, a plain record strip can be used and the longitudinal portions of the record line measured with an appropriate scale to ascertain the periods of time.

The system is preferably arranged to be shifted transversely of the direction of travel of the record member and trace a stepped line, as explained, but manifestly it could be differently arranged and moved so as to indicate the lengths of the periods of time intervening between successive movements.

While the device is primarily intended for use in determining and recording the periods of time consumed by workmen in performing the various movements or operations, the device is not necessarily restricted to such use but can be employed for other analogous purposes.

I claim as my invention:

1. The combination with a traveling record member, and a stylus which is arranged to engage said record member and make a record thereon, of means for shifting the stylus to successive different positions on the record member comprising a propelling device for said stylus, and a manually controlled escapement mechanism controlling the movement of said stylus by said propelling device, whereby the movement of said stylus from one of said positions to another is substantially instantaneous.

2. The combination with a traveling record member, and a stylus which is arranged to engage said record member and make a record thereon, of operating means for shifting the stylus at will to successive different positions on the record member comprising an actuating device and connections by which the stylus is shifted from one predetermined position to the next predetermined position by a simple movement in one direction of said actuating device.

3. The combination with a traveling record member, and a stylus which is arranged to engage said record member and make a record thereon, of operating means for shifting the stylus at will to successive different positions on the record member comprising a reciprocating finger key and connections by which the stylus is shifted step by step from one position to the next by a movement of the finger key in either direction.

4. The combination with a record member, and means for causing the same to travel at a uniform rate of speed, of a stylus arranged to trace a line on the record member, and means for shifting the stylus at will transversely of the direction of movement of the record member to different predetermined positions, comprising an actuating member and operative connections whereby the stylus is shifted from one position to the next by successive single movements of said actuating member.

5. The combination with a record member, and means for causing the same to travel at a uniform rate of speed, of a stylus arranged to trace a line on the record member, and means for shifting the stylus at will transversely of the direction of movement of the record member to different positions, comprising key-actuated mechanism which controls the transverse movement of the stylus and causes a step movement of the stylus each time the key is actuated.

6. The combination with a record member, and means for causing the same to travel at a uniform rate of speed, of a stylus arranged to trace a line on the record member, and means for shifting the stylus at will transversely of the direction of movement of the record member to different positions, comprising a spring for propelling the stylus in one direction, and key-actuated mechanism which controls the transverse movement of the stylus by said spring and causes a step movement of the stylus each time the key is actuated.

7. The combination with a record member, and means for causing the same to travel at a uniform rate of speed, of a stylus arranged to trace a line on the record member, and means for shifting the stylus at will transversely of the direction of movement of the record member to different positions, comprising a spring for propelling the stylus in one direction, a toothed rack connected with the stylus, a finger key, and escapement pawls which are actuated by said key and coöperate with said toothed rack to cause a step movement of the stylus each time the key is actuated.

8. The combination with a traveling record member, and a stylus which is arranged to engage said record member and make a record thereon, of operating means for shifting the stylus at will transversely of the direction of travel of the record member to different predetermined positions on the record member, comprising an actuating device and connections for shifting the stylus, step by step from one position to the next in contact with said record member, whereby the beginning and end of each successive portion of the record is accurately indicated.

Witness my hand, this 28th day of February, 1917.

HENRY H. WILLIAMS.

Witnesses:
C. W. PARKER,
A. L. McGEE.

Copies of this patent may be obtained for five cents each, by addressing the "Commissioner of Patents, Washington, D. C."